United States Patent [19]
Johnson et al.

[11] 3,903,027
[45] Sept. 2, 1975

[54] DIALLYL ISOPHTHALATE ENCAPSULATING COMPOSITIONS AND PROCESS FOR PREPARING THE SAME

[75] Inventors: Calvin K. Johnson, Palos Heights, Ill.; Robert F. Swanson, Athens, Mo.

[73] Assignee: CPC International Inc., Englewood Cliffs, N.J.

[22] Filed: May 13, 1974

[21] Appl. No.: 469,133

[52] U.S. Cl. ........ 260/23 R; 260/28.5 R; 260/42.15; 260/42.18; 260/42.52; 260/42.54
[51] Int. Cl.² .......................................... C08L 91/00
[58] Field of Search ............ 260/23 R, 42.15, 42.18, 260/42.52, 42.54

[56] References Cited
UNITED STATES PATENTS
2,275,957   3/1942   Groff ................................. 260/23

OTHER PUBLICATIONS
Electronic Packaging & Production, Segro et al. Vol. 10, No. 12, 1970, pp. 57–61.

*Primary Examiner*—M. J. Welsh
*Assistant Examiner*—William E. Parker
*Attorney, Agent, or Firm*—Albert P. Halluin

[57] ABSTRACT

Disclosed in the application are diallyl isophthalate encapsulating compositions, comprising:
- a. a thermosetting diallyl isophthalate prepolymer characterized as having a viscosity of less than about 40 c.p.s. at 25°C in a 50 percent solution of methyl ethyl ketone, said prepolymer being present in said composition in an amount ranging up to about 35 percent, by weight,
- b. a substantially pure inert filler,
- c. a free radical polymerization initiator present in an amount sufficient to promote thermosetting of said prepolymer at elevated temperatures, and
- d. a small but effective amount of a mold release agent, said encapsulating composition being characterized as having a Brabender melt viscosity at 150°C in minimum torque of from about 30 to about 100 metergrams and capable of providing, when cured, a substantially uniform Coefficient of Thermal Expansion at elevated temperatures such that the Coefficient of Thermal Expansion of the cured composition is less than about $45 \times 10^{-6}$ In/In/°C. at 185°C.

19 Claims, No Drawings

DIALLYL ISOPHTHALATE ENCAPSULATING COMPOSITIONS AND PROCESS FOR PREPARING THE SAME

BACKGROUND OF THE INVENTION

1. FIELD OF THE INVENTION

This invention relates to diallyl isophthalate encapsulating compositions having improved rheological properties as well as being capable of providing a low Coefficient of Thermal Expansion when the composition is cured to a thermoset resin. The improved encapsulating compositions contain a thermosetting diallyl isophthalate prepolymer characterized as having a viscosity of less than about 40 c.p.s. at 25°C in a 50 percent solution of methyl ethyl ketone.

2. DESCRIPTION OF THE PRIOR ART

In recent years plastic encapsulated devices have found widespread usage and acceptance in commercial and in industrial applications. These devices are generally manufactured by bringing a plastic-type of material into intimate contact with leads, interconnecting wires and other related circuitry. A number of advantages are obtained by encapsulating electrical components with plastic encapsulating compositions. These advantages include ruggedness, manufacturing ease and low cost.

Despite the advantages associated with the use of plastic compositions for encapsulating electrical devices there has been a general reluctance to accept plastic encapsulating devices because they do not enjoy a high reliability. For example, the prior art plastic encapsulated devices have experienced unreliability when exposed to moisture, temperature cycling and a relatively high Coefficient of Thermal Expansion at elevated temperatures. One of the more common failures of the prior art plastic encapsulated electrical devices in their thermo-instability at elevated temperatures.

The plastic compositions currently used commercially in high-speed low-pressure transfer moldings for encapsulating electrical components include the filled epoxy resin molding compositions and the filled silicone resin molding compositions. These materials are suitable because they provide many of the desired characteristics in the encapsulated product as well as being tractable enough to be used in the transfer molding system.

The allylic molding compounds are also widely used in molding structural and electrical parts by compression, transfer and injection molding techniques. The preferred compounds are based upon the diallyl phthalate prepolymer resins since these resins are capable of being thermoset to provide excellent electrical and mechanical properties. The molding compositions containing the diallyl phthalate resins possess excellent insulation resistance, dimensional stability, and chemical resistance.

The allylic resins compositions are generally processed into useful molding compositions by subjecting the resins to compounding operations which involve uniform dispersion of fillers and/or reinforcing fibers, catalysts, mold lubricants, pigments and incidental additives such as flame retardants and coupling agents. The molding composition must be such that it may be filled in the mold cavity during one stroke of the compression mold force, transfer ram or screw.

Diallyl phthalate molding compounds have been used extensively in electrical connectors because of their purity, long-term dimensional stability, insulation resistance, and retension of electrical properties at elevated temperatures and humidity. Because of these inherent properties, diallyl phthalate compounds have been the subject of considerable research as potential encapsulants for electronic devices. Unfortunately, the high pressure required to mold these compounds has limited their use as encapsulants.

Segro and Beacham in their article in *Electronic Packaging and Production*, Vol. 10, No. 12, pgs. 57–61 (1970) entitled "Pressure Sensitive-Device Encapsulation with the New Diallyl Resins" describe the use of diallyl phthalate molding compositions which could be formulated in a manner to permit low pressure encapsulation of sensitive devices in multi-cavity molds such as the integrated circuits. These molding compositions which were made with Dapon-D and Dapon MD prepolymers represent an improvement over the previously described diallyl phthalate molding compositions. However, these compositions still possess some deficiencies when compared to the commercial silicone and epoxy resin compositions. These deficiencies are:

1. they have an inadequate spiral flow,
2. their molding pressures required are too high because their melt viscosities in minimum torque, meter-grams are too high, i.e., 100–300 for Dapon D and 200–300 for Dapon MD (compositions containing diallyl isophthalate prepolymer),
3. their Coefficient of Thermal Expansion is too high, i.e., about $100 \times 10^{-6}$ In/In/°C. at 185°C., and
4. their glass transition temperatures are too low, i.e., about 150°C.

SUMMARY OF THE INVENTION

We have now discovered diallyl isophthalate compositions which overcome the deficiencies of the prior art diallyl phthalate compositions. The encapsulating compositions of the present invention possess rheological properties which permit their use in encapsulating a broad range of electrical type of circuitry. These new molding compositions can be molded at pressures as low as 100 p.s.i. For the first time, it is now possible to mold diallyl isophthalate compositions at the same low pressures used for commercial silicone and epoxy resin compositions. Thus, semi-conductor devices may be encapsulated without damage to sensitive circuitry or breaking any fine interconnecting wires.

The new diallyl phthalate encapsulating compositions of the invention have relatively low melt viscosities and their flows are long. These compositions are capable of having a EMMI spiral flow ranging from about 20 to about 60 inches at 300°F. (149°C) and at 2000 p.s.i. pressure. The compositions have excellent moldability. They exhibit good release from the mold and also exhibit a minimum of flash.

DESCRIPTION OF THE INVENTION AND THE PREFERRED EMBODIMENTS

The diallyl isophthalate encapsulating compositions of the invention are comprised of a mixture of:

a. a thermosetting diallyl isophthalate prepolymer characterized as having a viscosity of less than about 40 c.p.s. at 25°C in a 50 percent solution of methyl ethyl ketone, said prepolymer being present in said composition ranging up to about 35 percent, by weight, based on said composition, b. a substantially pure inert filler, c. a free radical polymerization initiator present in an amount sufficient to promote thermosetting of said prepolymer at elevated temperatures, and d. a small but effective amount of a mold release agent, said encapsulating composition being characterized as having a Brabender melt viscosity at 150°C in minimum torque of from about 30 to about 100 meter-grams and capable of providing, when cured, a substantially uniform Coefficient of Thermal Expansion at elevated temperatures such that its Coefficient of Thermal Expansion is less than about $45 \times 10^{-6}$ In/In/°C. at 185°C.

The diallyl isophthalate prepolymer component constitutes an important part of the compositions of the present invention. The diallyl isophthalate prepolymers which are used in the practice of the invention are viscose liquids or low-melting solids. The viscosities of these prepolymers are important. If the viscosity of the prepolymer is high, the viscosity of the molding composition will also be high. High viscosity molding compositions cannot be molded at low pressures. Thus, the prepolymers useful in the practice of the present invention must have a viscosity such that a 50 percent solution of the prepolymer in methyl ethyl ketone will be less than about 40 c.p.s. at 25°C and preferably more than about 5 c.p.s. at 25°C. The preferred viscosity of the prepolymer is in the range of from about 10 to about 25 c.p.s. at 25°C in a 50 percent solution of methyl ethyl ketone.

The diallyl isophthalate prepolymers useful in the practice of the invention can be made by polymerizing diallyl isophthalate monomer to a low molecular weight with a free radical polymerization catalyst and isolating the prepolymer from unreacted monomer and any solvent used. The prepolymers generally contain a small amount of unpolymerized residual diallyl isophthalate monomer. This monomer may be present in an amount ranging up to about 10%, by weight based upon the prepolymer. In the event the viscosity of the diallyl isophthalate prepolymer is too high, small amounts of additional monomeric diallyl isophthalate and/or diallyl ortho phthalate may be added to the prepolymer to reduce the viscosity of the composition. The monomer may be added in amounts up to about 2 percent, by weight or more to reduce the viscosity and increase the flow of the final molding composition.

The diallyl isophthalate prepolymers useful in the practice of the invention are commercially available. A particularly preferred prepolymer includes the prepolymer manufactured by Osaka Soda Co., Ltd. known as Diaso 100 L. Other diallyl isophthalate prepolymers may be employed provided, of course, if they possess the proper purity and viscosity as set forth herein. The diallyl isophthalate prepolymer is present in the molding compositions of the invention in amounts ranging up to about 35 percent, by weight, preferably in amounts ranging from 15 percent to about 30 percent, by weight, and more preferably, amounts ranging from about 20 percent to about 25 percent, by weight, based on the total molding composition. The molding composition should contain at least about 10 percent, by weight, of the prepolymer.

The filler component of the compositions is relatively important. The filler should be substantially pure since the presence of contaminants such as the ionic contaminants can cause corrosion of the electronic devices. Useful fillers include substantially pure inert materials such as silica, silicates, fiber glass and mixtures thereof. Silica and fused silica fillers are particularly preferred because of their purity. Other mineral fillers such as calcium silicate (Wollastonite), hydrated clays, calcined clays, chalk, glass (powdered), quartz, aluminum tryhydrate, aluminum oxide, antimony oxide, inert iron oxide, and mixtures thereof may also be included. The preferred filler is fused silica because of its purity and very low Coefficient of Thermal Expansion.

It is often desirable to obtain a product having a high impact and flexural strength. These greater mechanical strengths can be achieved by replacing a portion of the mineral filler described above with glass fibers. Either hammer-milled fibers or chipped-strand fibers may be used for this purpose.

The free radical polymerization initiator which forms another component of the compositions of the invention is present in an amount sufficient to promote thermosetting of the diallyl isophthalate prepolymer at elevated temperatures. These initiators are preferably peroxide or other free radical initiators which are stable at room temperatures but decompose at elevated temperatures and cause the prepolymer to polymerize and cure. Organic peroxides useful in the compositions include t-butyl perbenzoate, dicumyl peroxide, alpha, alpha' - Bis (t-butyl peroxy) diisopropylbenzene and ditertiary butyl peroxide.

The amount of the free radical initiator employed may be varied according to the type of initiator used, the reaction temperature, the reaction pressure, and/or the curing speed required or desired. If an insufficient amount of the initiator is employed, the glass transition temperature will be low and the Coefficient of Thermal Expansion will be too high because the prepolymer will not completely cure. Generally speaking, the compositions of the present invention will contain from about 0.01 percent to about 10 percent, by weight of the polymerization initiator based upon the prepolymer present in the composition. Preferably, the composition will contain from about 1 percent to about 5 percent by weight of the initiator based upon the amount of prepolymer present. It is generally desirable to use from about 3.5 to about 5 percent by weight of the initiator dicumyl peroxide based upon the weight of prepolymer and from about 2.5 to about 4 percent by weight of alpha, alpha' -Bis (t-butyl peroxy) diisopropylbenzene based on the weight of the prepolymer to obtain optimum properties although higher or lower catalyst levels may also be employed.

In molds having very long runner systems, such as molds having 400 to 600 devices to be encapsulated, it may be necessary to lengthen the gel time of the molding composition. This can be done by adding small amounts of inhibitors such as hydroquinone, p-methoxy phenol and 2, 6-di-t-butyl phenol to the formulation.

The compositions of the present invention will also contain a release agent. The control of the release properties of the molding compositions is very important. If too much release agent is added, the molding composition will not adher to the device and the wire leads. Water can then quickly penetrate into the device along the leads and cause the device to fail. If too little release agent is employed, the composition will stick to the mold. The release agent employed may be any known release agent employed for this purpose. Preferred release agents include calcium stearate, zinc stearate, and Carnauba wax and mixtures thereof. It is particularly preferred to employ calcium stearate as the release agent. The release agent can be employed in amounts ranging from about 0.25 to about 0.75 percent by weight of the composition, although higher levels of the release agent may be employed.

The compositions of the present invention may also include various pigments to vary the color of the molding compositions. For example, small additions of carbon black, bone black, etc., may be incorporated into the composition without adversely affecting the properties of the molding composition.

Good adhesion of the diallyl isophthalate resin to the filler is important. Poor adhesion and water resistance reduces mechanical strength of the cured molding compound. Silane coupling agents may be added to improve bonding and adhesion between the filler and the resin. Typical silane coupling agents which may be employed in the compositions of the invention include vinyl trimethoxy silane, vinyl triethoxy silane, vinyltris (2-methoxyethoxy) silane, gamma-glycidoxy propyl trimethoxy silane, and trismethoxy vinyl silane.

The addition of small amounts of other resins, polymers or additives may be made without causing detriment to the properties of the molding compositions of the present invention. For example, small amounts of diallyl orthophthalate monomer or prepolymers can be incorporated in the compositions of this invention to reduce the cost thereof. These additions will have the adverse affect of lowering the glass transition temperature and increasing the Coefficient of Thermal Expansion. However, the addition of these compounds may still be acceptable in some less demanding applications such as coil encapsulants. Reactive polyester resins which will coreact with the diallyl isophthalate prepolymers may also be employed to lower the cost at minimal sacrifice in properties. Replacement of up to 50 percent of the diallyl isophthalate prepolymer with diallyl orthophthalate or reactive can be tolerated in some instances. The silane coupling agent may be employed in amounts ranging from about 0.01 percent to about 1 percent, by weight, and preferably from about 0.05 percent to about 0.5 percent, by weight, based on the total weight of the composition. In some instances, flame resistance is a requirement of an encapsulating composition. The addition of small amounts of diallyl chlorendate, chlorinated polyester resins (e.g., Hetron resins produced by Hooker Chemical Company), hexabromo biphenol, decabromo biphenyl, decabromo diphenyloxide may be included in the compositions of the invention. Small amounts of these and similar flame retardants have little effect on the performance of the molding compositions of the present invention because they have low volatility or cure into the resins. They are water insoluble, and they are hydrolytically stable and have good thermal stability.

The prepolymers useful in this invention, as stated hereinabove, are very viscous liquids or semi-solids at room temperature. In view of this physical state of the prepolymers it makes it very difficult to handle the same. They are much too viscous to be poured and handled as a liquid and they cannot be handled as normal solids because the pieces will cake and crust together. The diallyl isophthalate prepolymers generally have a viscous flow at or near room temperature.

It is a particularly preferred embodiment of the present invention for preparing the diallyl isophthalate encapsulating composition by a method comprising:

1. intermittently mixing a mixture of:
    a. from about 10 percent to about 35 percent by weight of a frozen and brittle thermosetting diallyl isophthalate prepolymer which is characterized as having a viscosity of less than about 40 c.p.s. at 25°C in a 50 percent solution of methyl ethyl ketone,
    b. a substantially pure inert filler,
    c. a free radical polymerization initiator present in an amount sufficient to promote thermosetting of said prepolymer at elevated temperatures,
    d. a small but effective amount of a mold release agent,
    e. an organic liquid which is a solvent for said prepolymer, and
2. removing said organic liquid from the mixture to provide an encapsulating composition which is characterized as having a Brabender melt viscosity at 150°C in minimum torque of from about 30 to about 100 meter-grams. The diallyl isophthalate prepolymers are rendered frozen or brittle by cooling the same to a temperature of −5°C or colder. A convenient way of accomplishing this is to place the prepolymer in dry ice (−78.5°C) and cool it to that temperature, and thereafter grind the cold, brittle prepolymer. The resulting ground materials are then stored below −5°C and preferably at −78.5°C in dry ice for further use. The cold, ground powder can be easily weighed, poured and mixed with other materials just like any other solid material. In the cold process previously described, the prepolymer is not changed in any way.

Alternatively, the prepolymers can be heated until they have a viscosity low enough that they can be poured and handled as a liquid. This may require temperatures of 100°C or higher. Handling the prepolymers at these high temperatures has a disadvantage that some of the monomers present may be lost and because air oxidation of the polymer may occur.

The encapsulating compositions of the present invention do not employ as much resin as the prior art compositions. The compositions of the present invention will generally contain less than about 35 percent, by weight and preferably from about 15 percent to about 30 percent by weight of the diallyl isophthalate prepolymer based on the total weight of the composition. Particularly good results are obtained from compositions containing from about 20 percent to about 25 percent by weight of the prepolymer. This is quite unexpected since the prior art diallyl phthalate molding compositions generally require at least 35 percent by weight of the prepolymer.

The composition will, of course, contain a substantial amount of the filler. Generally speaking, the compositions will contain from about 60 percent to about 85 percent by weight of the inert filler which may include up to about 50 percent by weight of fiber glass based on weight of the filler.

The diallyl isophthalate encapsulating compositions of the invention as pointed out hereinabove are unique inasmuch as they have good rheological properties that permit them to flow around electronic devices by simply ramming the compositions into mold cavities and curing the same in a period of 15 to 60 seconds. The compositions have a very high glass transition temperature which is generally greater than 210°C, preferably greater, and a Brabender melt viscosity at 150°C in minimum torque of from about 30 to about 100 meter-grams. In most instances the encapsulating compositions of the invention when cured will have a Coefficient of Thermal Expansion of less than 40 × 10⁻⁶ In/In/°C at 185°C., and quite often less than 30 × 10⁻⁶ In/In/°C at 185°C.

The encapsulating compositions of the invention may be molded or used to encapsulate most any material by any of the common methods. They are particularly useful in compression molding and screw injection molding processes.

The following typical examples of the invention are presented by way of illustration and not by way of limitation. In the examples all parts are by weight unless otherwise indicated.

EXAMPLE 1

A powdered diallyl isophthalate prepolymer was prepared by placing a 20 pound chunk (9,071.8 grams) of prepolymer in a dry ice chest overnight (the prepolymer was Daiso-100L manufactured by Osaka Soda Co., Ltd. The prepolymer had a viscosity of 10 to 25 c.p.s. at 25°C in a 50% solution of methyl ethyl ketone.) The cold chunk was then hit with a hammer. It readily broke into small pieces which were immediately passed through a Model D Fitz Mill. The resulting powder was collected in a polyethylene bag and placed back into the dry ice chest for storage.

To a 10 gallon Pony Mixer, (a change can mixer manufactured by H. J. Day Company) there was added a 14,400 g. of fused silica, 100 g. of calcium stearate, 22 g. of carbon black, and 5,600 g. of the ground and frozen diallyl isophthalate prepolymer. The prepolymer was weighed immediately after removing it from the dry ice storage and added to the Pony Mixer as a free-flowing solid. The solid materials were mixed together for 5 minutes. Then a solution of 300 g. of dicumyl peroxide, 22 g. of trismethoxy vinyl silane and 6.6 g. of 2,6 di-t-butyl phenol in 2,000 g. of acetone was poured into the mixer and mixing was continued for 10 minutes. The semi-dry tacky mixture was then rolled on a hot 2-roll mill to completely remove the acetone and completely disperse the carbon black pigment and other components of the mixture. A roll temperature of 140°F to 210°F (60°C to 99°C) was used. Rolling times are dependent on the roll mill temperatures. At roll temperatures of about 200°F (93.5°C) rolling times of 4 to 10 minutes were needed to completely remove the acetone and disperse all of the components of the mixture. The product was removed from the mill and allowed to cool to room temperature. The product was a black mass which had some cold flow at room temperature.

The mass could be formed into long ropes by extruding it through a round die. The round rope may be cut into short lengths (logs) or wound onto a spool. The product may also be stored or shipped in the form of logs or a wound spool of material.

The above black mass-type product was formed into a rope or log by extruding it through a round die. A short length of the rope was placed directly in a compression press (the pot of a transfer press may also be employed). The material was then forced into a hot mold having a temperature of 300°–380°F (149°–193.5°C). (As a preferred method of curing the composition, a short piece of the material may be preheated in a dielectric preheater to 150°–200°F (66°–93.5°C) before placing it in the press. Preheating improves the moldability and shortens the cure time.) The cure time was generally less than 30 seconds, particularly at the higher temperatures. These short-cure times were quite unexpected since longer cure times have been required for the prior art compositions. The short-cure times represents a distinct advantage in terms of time saved in the manufacture of encapsulated materials.

The molding composition of Example 1 was tested for its physical properties. These properties were as follows:

TABLE 1

| | |
|---|---|
| Molded Shrinkage, In/In | 0.006 |
| Molded Density or Specific Gravity | 1.8 |
| Flexural Strength, p.s.i. | 12,000 |
| Impact Strength, ft/lb/In Notch IZOD | 0.30 |
| % Water Absorption at 50°C, 48 Hrs. Immersion | 0.20 |
| Dielectric Constant, 1 MH₂ | 3.5 |
| Dissipation Factor, 1 MH₂ | 0.010 |
| Volume Resistance, Megohms (ohms/cm) | 4.0 × 10¹³ |
| EMMI Spiral Flow, 300°F. at 2000 p.s.i. | 33 inches[1] |
| Glass Transition Temperature, Tg | 240°C |
| Brabender Melt Viscosity at 150°C., Min. Torque. | 45 meter-grams[1] |

[1]Uncured samples.

The viscosity and the other rheological properties of the composition of Example 1 were determined using a Brabender Plasti-Corder with a No. 6/2 roller-type mixing head. The temperature was maintained at 150°C with a head-speed of 40 r.p.m.

The cured product of Example 1 was tested for its Coefficient of Thermal Expansion (CTE) on a Thermal Mechanical Analyzer manufactured by Perkin Elmer using ¼ inch thick test samples. The test samples which had been postbaked for 4 hours at 150°C were heated at a rate of 5°C/minute in the machine and the CTE values were read off the graph from the machine. The results of this test is set forth in the following Table which indicates the CTE values of the material measured perpendicular to the flow on a transfer molded bar.

TABLE 2

Coefficient of Thermal Expansion

| Temperature, °C | CTE, In/In/°C × 10⁻⁶ |
|---|---|
| 50 | 28 |
| 100 | 29 |
| 150 | 30 |
| 185 | 33 |

As it can be seen from the data in Table 2, the cured composition has a substantially uniform Coefficient of Thermal Expansion at elevated temperatures which was even less than 35 ×10⁻⁶ In/In/°C. at 185°C. This is a distinct advantage over many of the prior art materials which contain diallyl phthalate polymers which often have CTE values of about 100 × 10⁻⁶In/In/°C at 185°C. This low, uniform expansion minimizes the breakage of interconnecting wires or wire bonds. Tests have revealed that the CTE remains substantially constant from room temperature to the glass transition temperature of the material, i.e., 240°C.

The composition of Example 1 was compared to that of similar compositions except that the diallyl isophthalate prepolymer was replaced with polymers indicated in the following table.

TABLE 3

|  | Melt Viscosity in Minimum Torque, Meter-Grams | Total Time To Cure |
|---|---|---|
| Example 1 | 45 | 1.75 min |
| Commercial Epoxy | 60 | 2.25 min |
| Commercial Silicone | 45 | 5.5 min |
| Diallyl Ortho-phthalate (Dapon D) | 180 | 9.0 min |

It is readily apparent from the data in Table 3 that the compositions of the present invention have a melt viscosity at least as good, and sometimes better than the prior art silicone and epoxy formulations and far superior to the ortho-phthalate compositions. Also, the compositions of the present invention can be cured much faster than those of the prior art formulations.

EXAMPLE 2

Several encapsulating compositions were prepared in the manner described in Example 1, using different polymers in each instance. The compositions were cured and tested in the manner described in Example 1. Table 4 illustrates the rheological properties of the various compositions which demonstrates their relative ability to be molded without damage to sensitive circuitry or breaking any fine interconnecting wires.

TABLE 4

| Polymer In Composition | EMMI Spiral, 300°F | Melt Viscosity Min. Torque Meter-Grams 150°C |
|---|---|---|
| Diallyl Isophthalate | 20–60" | 30–100 |
| Diallyl Orthophthalate (Dapon D) | 10–20" | 100–300 |
| Epoxy | 20–60" | 30–100 |
| Silicone | 20–50" | 40–100 |

The data in Table 4 clearly illustrates that the compositions of the present invention have improved spiral flow (i.e., up to 60 inches) and melt viscosities comparable to the commercial epoxy and silicone compositions of the prior art, i.e., a minimum torque at 150°C of 30–100 meter-grams.

The silica filled diallyl isophthalate composition made in this example was tested for its Coefficient of Thermal Expansion and the results of this test are set forth in Table 5.

TABLE 5

| Temperature | CTE, In/In/°C |
|---|---|
| 50°C | $23 \times 10^{-6}$ |
| 100°C | $24 \times 10^{-6}$ |
| 150°C | $26 \times 10^{-6}$ |
| 185°C | $28 \times 10^{-6}$ |

This data further confirms that fact that the compositions of the invention have a very low Coefficient of Thermal Expansion which remains substantially constant from room temperature to the Tg of the composition.

The new diallyl isophthalate containing compositions of Example 2 were further tested to ascertain their thermal stability. The data as set forth in Table 6 was obtained by aging ½ × ½ × 5 inch test bars or 2 inch discs in air at 200°C.

TABLE 6

|  | Effect of Aging at 200°C | |
|---|---|---|
|  | 0 Hours | 1000 Hours |
| Dielectric Constant, 1 MH$_z$ | 3.55 | 3.50 |
| Dissipation Factor, 1 MH$_z$ | 0.0081 | 0.0060 |
| Weight Loss, % | — | 0.80 |
| Flexural Strength, p.s.i. | 13,400 | 13,200 |

As it can be seen from the data in Table 6, there was very little change in flexural strength, dielectric constant ro sample weight after 1,000 hours at 200°C. The dissipation factor decreased about 26 percent. Most of the weight loss and change in dissipation factor occur within the first 100 hours and may be due to a loss of volatiles such as catalyst fragments.

EXAMPLE 3

Two additional molding compositions were prepared as in Example 1. One of the compositions contained silica as the filler and was substantially the same type of composition described in Example 1. The other composition contained both silica and fiber glass as the filler. This composition contained 24.19 percent, by weight of fused silica, 24.19 percent, by weight of Novasite silica, 24.19 percent, by weight of ⅛ inch fiber glass and 24.19 percent, by weight of the ground diallyl isophthalate prepolymer (Diaso 100L). Both of the compositions also included calcium stearate, carnauba wax, carbon black, dicumyl peroxide and trismethoxy vinyl silane. The compositions were cured and tested as in Example 1. The results of the tests are set forth in Table 7.

TABLE 7

Mechanical and Electrical Properties of Diallyl Isophthalates Encapsulation Compositions

|  | Silica Filled | Glass/Silica Filled |
|---|---|---|
| Molded Density | 1.8 | 1.9 |
| Flexural Strength, p.s.i. | 12,000 | 14,000 |
| Tensile Strength, p.s.i. | 7,500 | 7,500 |
| Impact Strength, ft/lb/in. notch | 0.3 | 0.40 |
| Compressive Strength, p.s.i. | 25,000 | 25,000 |
| Heat Distortion Temp., °C. | 300 | 300 |
| Arc Resistance, Sec. | 180' | 180' |
| Dielectric Constant | 3.5 | 3.5 |
| Volume Resistance, Megohms | $4.0 \times 10^{13}$ | $2.0 \times 10^{13}$ |
| Surface Resistance, Megohms | $2.0 \times 10^{13}$ | $2.0 \times 10^{13}$ |
| Water Extract Conductance, Megohms $\times 10^{-6}$ | 8 | 17 |
| % Water Absorption - 50°C | 0.2 | 0.2 |

TABLE 7 – Continued

Mechanical and Electrical Properties of
Diallyl Isophthalates Encapsulation Compositions

| | Silica Filled | Glass/Silica Filled |
|---|---|---|
| EMMI Spiral Flow, 149°C, at 2000 p.s.i. | — | 35 inches |
| Melt Viscosity, Brabender, minimum torque at 150°C | — | 50 meter-grams |
| Coefficient of Thermal Expansion, at 185°C | — | 34 × 10⁻⁶ In/In/°C |

The data in Table 7 illustrates that the compositions of the invention have good long-term dimensional stability, moisture resistance and storage stability (i.e., they retain over 95 percent of their original EMMI spiral flow after 6 months at 73°F (23°C), and at 104°F (40°C), they retain over 80 percent of their original flow after 4 months.) Therefore, refrigeration during storage and shipping is not required.

It is apparent from the above Examples and data that the new diallyl isophthalate containing molding compositions possess a unique combination of properties, such as good electrical properties, high purity, moisture resistance, mechanical strength, high glass transition temperature, low Coefficient of Thermal Expansion and excellent moldability (i.e., they can be molded at 100–1,000 p.s.i. pressures) which make them useful as encapsulants for electronic devices.

The composition of Example 1 was employed to encapsulate an electrical member by the following procedure. A piece of the log of the composition which corresponds to the required weight of the molding compositions was obtained. The piece of the log was preheated in a dielectric preheater to a temperature of 160°–190°F. The preheated shot (piece) was placed in a transfer pot of a transfer press. The material was then forced into the hot mold (the mold temperature was 300°–380°F) and around the electronic devices by applying pressure (about 20 p.s.i.) with the transfer ram. The molding pressures can range from 100–1000 p.s.i. The material was cured 15–60 seconds and then the encapsulated electrical member was ejected from the mold. The encapsulated devices may be post-baked to develop optimum properties.

EXAMPLE 4

This example illustrates a flame resistant encapsulating composition.

To a 10 gallon Pony Mixer, a change can mixer manufactured by H. J. Day Company, there was added 14,850 grams of fused silica, 250 grams of antimony oxide as the flame retardant, 10 grams of carbon black, 360 grams of hexabroma biphenyl, 100 grams of calcium stearate and 4,400 grams of ground diallyl isophthalate prepolymer (Diaso 100L). The prepolymer was weighed immediately after removing it from the dry ice storage. The solid materials were mixed together for 5 minutes. Thereafter a solution of 144 grams of alpha, alpha' Bis (t-butyl peroxy) diisopropylbenzene, and 76 grams of trismethoxy vinyl silane in 2000 grams of acetone were poured into the mixer and mixing was continued for 10 minutes. The resulting semi-dry tacky mixture was then rolled on a hot 2 roll mill to completely remove the acetone and completely disperse the carbon black and other components of the mixture. After rolling for 10 minutes at 70°–90°C., the product was removed from the rolls and allowed to cool to room temperature. The gray colored molding compound had the following properties:

TABLE 8

| | |
|---|---|
| EMMI Spiral Flow, 149°C, at 2000 p.s.i. | 37 inches |
| Melt Viscosity, Brabender, Minimum Torque at 150°C (No. 6/2 Roller type mixing head with head speed of 40 r.p.m.) | 80 meter-grams |
| Coefficient of Thermal Expansion at 185°C | 35.6 × 10⁻⁶ In/In/°C |
| Flame Resistance U. L. Flame Test 94V-1 run on 1/8 inch thickness bars | passed |

The above data further demonstrates the outstanding properties of the compositions of the invention, and particularly the flame retardant properties thereof without a reduction in overall physical properties.

While the invention has been described in connection with specific embodiments thereof, it will be understood that it is capable of further modification, and this application is intended to cover any variations, uses, or adaptions of the invention following, in general, the principles of the invention and including such departures from the present disclosures as come within known or customary practice in the art to which the invention pertains and as may be applied to the essential features hereinabove set forth, and as fall within the scope of the invention.

We claim:

1. A diallyl isophthalate encapsulating composition, comprising:
   a. a thermosetting diallyl isophthalate prepolymer characterized as having a viscosity of less than about 40 c.p.s. at 25°C. in a 50 percent solution of methyl ethyl ketone, said prepolymer being present in said composition in an amount ranging up to about 35 percent, by weight,
   b. a substantially pure inert filler selected from the group consisting of silica, silicates, fiber glass and mixtures thereof,
   c. a free radical polymerization initiator present in an amount sufficient to promote thermosetting of said prepolymer at elevated temperatures,
   and
   d. a small but effective amount of a mold release agent,
   said encapsulating composition being characterized as having a Brabender melt viscosity at 150°C. in minimum torque of from about 30 to about 100 meter-grams and capable of providing, when cured, a substantially uniform Coefficient of Thermal Expansion at elevated temperatures such that its Coefficient of Thermal Expansion is less than about 45 × 10⁻⁶ In/In/°C. at 185°C.

2. The composition of claim 1, wherein said composition contains from about 15 percent to about 30 percent, by weight of said prepolymer.

3. The composition of claim 1, wherein said composition contains from about 20 percent to about 25 percent, by weight of said prepolymer.

4. The composition of claim 1, wherein said composition contains from about 60 percent to about 85 percent, by weight of said inert filler.

5. The composition of claim 4, wherein said inert filler is a mixture of silica and fiber glass.

6. The composition of claim 1, wherein said composition additionally contains a silane coupling agent.

7. The composition of claim 1, wherein said composition additionally contains monomeric diallyl isophthalate in an amount sufficient to reduce the viscosity of said composition.

8. The composition of claim 1, wherein said prepolymer has a viscosity of from about 10 to about 25 c.p.s. at 25°c.p.s. at 25°C in 50 percent solution of methyl ethyl ketone.

9. The composition of claim 1, wherein said composition contains up to about 50 percent, by weight of fiber glass.

10. The composition of claim 2, wherein said composition, when cured, has a Coefficient of Thermal Expansion of less than about $35 \times 10^{-6}$ In/In/°C. at 185°C.

11. A diallyl isophthalate encapsulating composition, comprising:
   a. a thermosetting diallyl isophthalate prepolymer characterized as having a viscosity of from about 10 to about 25 c.p.s. at 25°C in a 50 percent solution of methyl ethyl ketone, said prepolymer being present in said composition in an amount ranging from about 15 percent to about 30 percent, by weight,
   b. a substantially pure, water insoluble inert filler selected from the group consisting of silica, silicates, fiber glass and mixtures thereof, said filler being present in an amount ranging from about 65 percent to about 85 percent, by weight,
   c. a free radical peroxide-type polymerization initiator present in an amount sufficient to promote thermosetting of said prepolymer at elevated temperatures, and
   d. a small but effective amount of a mold release agent, said molding composition being characterized as having a glass transition temperature greater than 210°C, a Brabender melt viscosity at 150°C in minimum torque of from about 30 to about 100 meter-grams, and being further characterized as being capable of providing, when cured, a substantially uniform Coefficient of Thermal Expansion at elevated temperatures such that its Coefficient of Thermal Expansion is less than about $40 \times 10^{-6}$ In/In/°C. at 185°C.

12. The composition of claim 11, wherein said inert filler is a mixture of silica and fiber glass.

13. The composition of claim 11, wherein said composition additionally contains a silane coupling agent.

14. The composition of claim 11, wherein said composition additionally contains a flame retardant.

15. The composition of claim 11, wherein said mold release agent is calcium stearate.

16. A process for preparing a diallyl isophthalate encapsulating composition comprising:
   1. intermittently mixing a mixture of:
      a. from about 10 percent to about 35 percent, by weight of a frozen and brittle thermosetting diallyl isophthalate prepolymer which is characterized as having a viscosity of less than about 40 c.p.s. at 25°C in a 50 percent solution of methyl ethyl ketone,
      b. a substantially pure inert filler selected from the group consisting of silica, silicates, fiber glass and mixtures thereof,
      c. a free radical polymerization initiator present in an amount sufficient to promote thermosetting of said prepolymer at elevated temperatures,
      d. a small but effective amount of a mold release agent, and
      e. an organic liquid which is a solvent for said prepolymer, and
   2. removing said organic liquid from the mixture, to provide an encapsulating composition characterized as having a Brabender melt viscosity at 150°C in minimum torque of from about 30 to about 100 meter-grams and capable of providing, when cured, a substantially uniform Coefficient of Thermal Expansion at elevated temperatures such that its Coefficient of Thermal Expansion is less then $45 \times 10^{-6}$ In/In/°C. at 185°C.

17. The process of claim 16, wherein carbon black and other fillers are added to the mixture.

18. The process of claim 16, wherein said organic liquid is removed by heating the mixture on a hot roll mill to form a dry uniform mixture.

19. The process of claim 16, which includes the additional step of compressing the dry composition in a mold and heating the composition in the mold to cure the composition to a thermoset resin composition.

* * * * *